United States Patent [19]
Murray

[11] Patent Number: 5,283,878
[45] Date of Patent: Feb. 1, 1994

[54] METHOD AND APPARATUS FOR ENCODING DATA TYPES FOR OBJECT IDENTIFICATION

[75] Inventor: Kelly E. Murray, Belchertown, Mass.

[73] Assignee: Top Level, Inc., Amherst, Mass.

[21] Appl. No.: 560,442

[22] Filed: Jul. 31, 1990

[51] Int. Cl.⁵ .............................................. G06F 12/06
[52] U.S. Cl. .................... 395/425; 364/736; 364/254; 364/254.3; 364/DIG. 1
[58] Field of Search ............... 364/DIG. 1, DIG. 2, 364/736; 395/425, 800

[56] References Cited

U.S. PATENT DOCUMENTS 4,644,489 2/1987 Curtin et al. .................. 364/736
4,922,414 5/1990 Holloway et al. ............. 345/400

Primary Examiner—Thomas C. Lee
Assistant Examiner—Paul R. Lintz
Attorney, Agent, or Firm—Brooks & Kushman

[57] ABSTRACT

Method and apparatus are provided for encoding data types to identify the type of object being operated on during execution of a computer program on a data processing system including byte-addressed memory. The object is represented by at least one machine word having a plurality of bits. The method includes the steps of storing an object in the byte-addressed memory so that the lower three bits of the object are in a zero state and setting one of the lower three bits to a non-zero state to indicate a particular data type. Three different types of data can be verified by checking the state of a single bit. In one embodiment of the invention the method further includes the step of setting a second one of the lower three bits to a non-zero state to indicate that the object, such as NIL, is a member of two data types. In a second embodiment of the invention the method further includes the step of setting a bit immediately adjacent the lower three bits to a non-zero state to indicate whether the object is a short-float object. The invention has particular utility for use with the computer programs written in a LISP-like language.

8 Claims, 5 Drawing Sheets

LOW BIT ASSIGNMENTS

BIT 0 = HEADERED
BIT 1 = LIST
BIT 2 = SYMBOLS

PRIOR ART
SHIFTED, HIGH-BITS ENCODING

32-BIT WORD

5 TYPE BITS $2^5$ = 32 DIFFERENT TYPES $2^{27}$ ≅ 131 MEGABYTES REMAINING

24-BIT WORD

4 TYPE BITS $2^4$ = 16 DIFFERENT TYPES $2^{24}$ ≅ 16 MEGABYTES REMAINING

PRIOR ART
LOW - BITS ENCODING

ONE - WORD ALIGNED ADDRESSING

PRESENT ADDRESS = 0000 0000 (BIT 1, BIT 0)
→ 0000 0001
→ 0000 0010
→ 0000 0011
→ 0000 0100 → NEXT ADDRESS
→ 0000 0101
→ 0000 0110
→ 0000 0111
→ 0000 1000 → NEXT ADDRESS

TWO - WORD ALIGNED ADDRESSING

PRESENT ADDRESS = 0000 0000 (BIT 2, BIT 1, BIT 0)
→ 0000 0001
→ 0000 0010
→ 0000 0011
→ 0000 0100
→ 0000 0101
→ 0000 0110
→ 0000 0111
→ 0000 1000 → NEXT ADDRESS

FIG. 2

PRIOR ART

POINTER-DIRECT, BIT-ASSIGNMENT ENCODING

5 HIGH BITS = ONLY 6 TYPES
        00000
        00001
        00010
        00100
        01000
        10000

3 LOW BITS = ONLY 4 TYPES
        000
        001
        010
        100

LOW BIT ASSIGNMENTS

BIT 0 = SYMBOL
BIT 1 = CONS
BIT 2 = OBJECT DIRECT ENCODING

PRIOR ART
LOW BIT ENCODINGS

I = IMMEDIATE (except Fixnums)
N = ALLOCATED NUMBER
F = FUTURE 0 0 0 0 0 0 0 0 FIXNUM
0 1 0 0 0 0 0 0 CHARACTER
0 1 0 1 0 0 0 0 SHORT FLOAT
1 0 0 0 0 0 0 0 FUTURE

LOW BIT ASSIGNMENTS

BIT 0 = HEADERED
BIT 1 = LIST
BIT 2 = SYMBOLS

LOW BYTE ENCODINGS

```
0000  0000  FIXNUM
0010  0000  CHARACTER
XXXX  1000  SINGLE FLOAT
1000  0000  FUTURE
```

METHOD AND APPARATUS FOR ENCODING DATA TYPES FOR OBJECT IDENTIFICATION

TECHNICAL FIELD

The present invention is related to a method of and apparatus for encoding the various data types that may be operated on during the execution of a computer program such as a computer program written in a LISP-like Language.

BACKGROUND

A Common LISP system, unlike strongly-typed languages such as Pascal, uses latent data typing. Latent typing allows a function to delay the determination of the "type" of an argument during run-time. Type identification is important because although some functions can operate on multiple data types, others operate only on specific data types. The program must be able to identify types and invoke appropriate functions.

Functions that operate on pointers to LISP objects, however, do not need to know the objects' data type. Only when the value of the LISP object is operated on is its data type required. This characteristic allows the LISP program to manipulate "unknown-type" objects, and serves to support the use of future objects in LISP as disclosed by reported by Robert H. Halstead, Jr., of the Massachusetts Institute of Technology, in his article entitled "Multilisp: A Language for Concurrent Computation", which appeared in the October, 1985 issue of ACM Transactions on Programming Languages and Systems, Vol. 7, No. 4.

Most functions, nevertheless, do operate on their arguments and therefore need to know to which data type the arguments belong. It is well known that this data type checking requirement can consume significant computational resources. This is one reason why machines that execute LISP code, which perform these type checks as part of their normal instruction cycle, have a performance edge over "stock" hardware. This is also why compiler declarations for eliminating run-time data type checking can result in significant increases in performance.

Data type checking of the prior art includes the Object Direct, Pointer Indirect, Tagged and Pointer Direct schemes. The Object Direct scheme encodes the type with the object. Its disadvantages stem from the extra space required in each object to hold the data type information, in addition to the necessary memory reference when only a pointer to the object is available.

While the Pointer Indirect method reduces the storage overhead of the Object Direct method by dividing the available memory into regions for each data type, uneven storage can occur, resulting in large "holes" of memory that are unused.

The Tagged scheme is inherently undesirable because of the specialized hardware requirements that follow from encoding the type in the pointer, but separate from the address.

The Pointer Direct scheme encodes the type directly in the pointer. The need to access memory is eliminated, driving performance up, and special hardware is not required.

Within the Pointer Direct scheme, there are several methods in the prior art of encoding the type in the pointer. An important consideration in type encoding is the handling of immediate objects. These objects are known to include small integers or "fixnums," small floats and characters. By representing these objects in the pointer itself, memory does not have to be allocated for them. The non-type bits of the pointer contain the immediate object. If an operation involving immediate objects could result in an overflow, the data must be shifted in the high bits to allow for detection. If no overflow is possible, the shifts are unnecessary.

When immediate objects are not involved, Shifted, High-bits Encoding can be used. In this method, the high address bits of the 32 bit word are used to divide the memory into regions, each associated with only one data type. Thus, each data type has its own contiguous block of memory. To retrieve the type from the pointer, the lower address type bits must be compared to a given type code. This is accomplished by either masking out the lower bits and comparing or shifting the pointer and comparing. Care must be taken when shifting or masking to insure valuable information (i.e. the operand) is not destroyed during the operation.

The main disadvantage with this method reveals itself when the programmer is determining how many bits to allocate for type representation. The number selected determines how many types can be distinguished, in addition to determining the size of that type's associated region. This relationship can be seen in FIG. 1. An allocation of 5 bits out of a 32-bit address yields typing support for 32 different data types, which is usually adequate. The resulting memory, roughly 131 megabytes, should also be sufficient for most Common LISP applications. If, however, a full 32-bit address is not supported, a severe shrinkage in the region size results. A 24-bit address with 5 type bits yields only a one-half megabyte space, leading to frequent garbage collections and an inability to support the larger applications. Further, while reducing the number of type bits is a consideration, it is not acceptable. This is because while a reduction in type bits to 4 would yield roughly 16 megabytes of memory space, it would also reduce the number of types available to 16. This would result in some objects sharing the same pointer type, forcing a supplemental method of type representation.

An additional disadvantage of the Shifted, High-bits encoding method is the sparsely populated virtual address space that frequently results. This is because storage allocated for one type may be unused while other types run out of storage space.

An alternative to using the high bits to encode is to use the Low-bits Encoding method. While this method has a number of known advantages, there are disadvantages. In addition to shifting or masking problems of high-bits encoding, there are not enough low bits available for encoding. This problem is shown in FIG. 2. In a byte-addressed machine with a 32 bit word size, a one-word-aligned address leaves bit 0 and bit 1, the two lower bits, as zeros. Because these are not used for addressing, they can be used for type encoding. A two-word alignment can also be used, but this only frees a third bit for type encoding, allowing 8 types.

An additional complication occurs when the pointer address is not aligned properly after shifting or masking. Resultant memory accesses are slowed with unaligned addresses, since additional bus cycles are required to align the addresses by adding a displacement to the pointer.

Another variation of low-bit encoding is called Shifted-Address, Low-bits Encoding. In this method, the full lower byte is used to encode, allowing 256 types to be encoded. The low byte must be shifted out before the pointer is used to reference memory to get the object. A common compare-byte instruction can be used to the test low byte. The major problem with this scheme is that the pointer must always be shifted before a memory reference, even when type checking is not being performed.

Another problem with this scheme is that the address space is limited to 24 bits when using a 32 bit address. While one-word and two-word alignment can add two to three bits respectively (see FIG. 2), the same alignment complications associated with Low-bits Encoding exist.

The last method of the prior art used for type encoding is called Pointer-direct, Bit-assignment Encoding, and can be used for high-bit or low-bit encoding. Instead of using a bit pattern to encode a data type, individual bits are assigned in the pointer to represent a certain data type. In this method, only a bit test needs to be performed. The disadvantage with this method is that there is only a limited number of bits available for assignment. For example, if bit-assignment encoding using 5 type bits, only 6 types can be represented, as shown in FIG. 3. Using these same 5 bits in the shifted, high-bit scheme yielded 32 types.

Similarly, in the low-bits case, if bit-assignment encoding using 3 type bits, only 4 types can be encoded. Using these same 3 bits in non-bit-assignment low-bits encoding yielded 8 types.

A hybrid of the aforementioned strategies was proposed by the authors of COINS Technical Report No. 88-35, dated Sept. 15, 1988 and entitled "Common Lisp Object Representation Strategies: The Umass Parallel Common Lisp Implementation". The inventor of the present application was a co-author of the report. A combination of the Object Direct and Pointer Direct strategies discussed above is used. By using two-word alignment, the lowest 3 bits are available for encoding. Specific types are assigned to these lower 3 bits, and the assignments are shown in FIG. 4. If, however, these three bits are all zeros, then 5 additional bits, bit 3 through bit 7, are encoded to contain the type of the object. These bit encodings are displayed in FIG. 5. Each of the types represented are briefly discussed below, followed by the disadvantages of the scheme.

If all three lower bits are zeros, then the full lower byte contains the type of object. For these, a simple compare-byte instruction is used. Characters have bit 6 set, and the second byte contains the code. "Fixnums" do not have bit 6, the immediate bit, set as do all other immediate objects. Because of the desire to provide for quick checking and operation on fixnums, fixnums are represented by having the entire lower byte all zeros. This allows for fixnums to be operated on directly without any shifting, masking or correction.

All of the non-immediate types are encoded in the low-byte with bit 3 set. Thus, the comparing done for type checking using the EQL test (the default test function for many Common LISP functions) is done with no memory reference. The pointers to these non-immediate numbers do, nonetheless, have to be shifted before accessing their values. In addition, the address space available to them is reduced to only 27 bits (shift 5, leaving the 3 high type bits as the lowest address bits). These drawbacks are minimized by the fact that these numbers were not intended to be "high-performance" numbers, nor are they heavily used. Time spent manipulating their values surpasses the extra instruction to shift the pointer.

The hybrid scheme also supports futures, and supports them as first class objects. This effects the EQ test, another frequently used LISP test. In LISP, two objects are EQ if either they are identical pointers, OR if either or both of them is a future object which has a determined value that is "EQ" to the other object. As a result, all EQ tests must check for futures before failing. And because the future type is encoded directly in the pointer (bit 7), no memory reference is required. This however, has the same drawbacks as the non-immediate types: the pointer must be shifted before accessing the future object. Because the large majority of time the objects will not be futures, the tradeoff is acceptable.

The object direct portion of the scheme utilizes bit 2, as shown in FIG. 4. When set, the object begins with a header word, with the low byte in the header containing the type. Testing for these types requires a memory reference. Possible types include arrays, structures, compiled functions and any number of user-defined types.

Testing for either a Symbol or List (Cons) is a simple bit test. The key is setting the appropriate bit. For a Symbol, seven is subtracted from the two-word-aligned pointer. Referring back to FIG. 2, one can see this has the effect of setting bit 0. For a List, six is subtracted from the two-word-aligned pointer. Again, referring back to FIG. 2, it can be seen this shift has the effect of setting bit 1. To access the Symbol, similar positive displacements are made to align the pointers to word boundaries.

There are, however, two main disadvantages with this scheme. The first main disadvantage deals with the representation of NIL. In a LISP system, NIL can be operated on as a Symbol or a List. As a result, bit 0 and bit 1 in FIG. 4 should both be set for NIL. The problem comes when accessing the memory location. For a Symbol operation, seven should be added to the pointer. This addition leaves the lower 3 bits equal to 010. For the far more common List operation, six should be added to the pointer. This addition leaves the lower 3 bits equal to 001. Because the system is two-word-aligned, and the lower two bits are not 00, both of these results are not word-aligned. Either subsequent access will be exceedingly lengthy because the access is across a word boundary.

In other words, in a binary system, bit 0 and bit 1 represent "1" and "2" respectively, and bit 3 represents "4". In a word-aligned system, addresses occur every four bytes. Subsequently, word boundaries occur every four bytes, i.e. 0, 4, 8, etc. When the lower two bit are not all zeros, and a memory access occurs, a word boundary must be crossed. And when word boundaries are crossed, memory accesses are costly from a performance standpoint. The other disadvantage deals with the representation and subsequent use of a certain type of immediate object: a short-float. Because the entire lower byte is used for type encoding, short-floats have only 24 bits of value. This results in rather low precision. In addition, a mechanism has to be utilized which converts the 24-bit short-float into a representation which is recognizable by the hardware. This conversion is quite costly from a performance standpoint.

DISCLOSURE OF THE INVENTION

The claimed invention builds on the hybrid scheme of the prior art, and overcomes the major disadvantages of that scheme. The data type encoding strategy of the present invention uses the low bits for type encoding, but improves on the prior art by manipulating the low-bit assignments and designing new encodings for data types. The new bit assignments and encodings result in significant reductions in computational overhead when performing a List operation on NIL.

The second major improvement deals with the short-float object. Utilizing the new bit assignments and encodings, short-floats use a representation that, unlike the prior art, is consistent with the hardware. This results in increased precision and a significant speedup in computation time.

Accordingly, it is an object of the invention to provide a method of encoding data types to identify the type of object being operated on during execution of a computer program.

It is also an object of the invention to provide a method of storing the object in the byte addressed memory so that the lower three bits of the object are in a zero state.

It is a further object of the invention to permit the setting of any one of the lower three bits to a non-zero state to signify a particular data type wherein multiple types of data can be verified by knowing the state of a single bit.

It is another object of the present invention to provide a method of setting a second one of the lower three bits as an indicator that the object belongs to more than one data type.

It is a further object of the invention to permit the setting of a bit adjacent to the lower three bits to a non-zero state to indicate a short-float object wherein such indication results in an increase in computational precision and a reduction in computational overhead.

It is also an object of the invention to provide for the encoding of up to sixteen additional data types by permitting the setting of at least one of a plurality of bits adjacent the four lower bits wherein the four lower bits are all in a zero state.

It is an additional object of the present invention to utilize latent data typing to indicate object type wherein such typing is allowed to vary until and during run-time.

In carrying out the above objects and other objects of the present invention in a data processing system including a byte-addressed memory, a method is provided for encoding data types to identify the type of object being operated on during execution of a computer program on the system. The object is represented by at least one machine word having a plurality of bits. The method includes the steps of storing an object in the byte-addressed memory so that the lower three bits of the object are in a zero state and setting one of the lower three bits to a non-zero state to indicate a particular data type, wherein three different types of data can be verified by checking the state of a single bit. In carrying out the above method, step 1 apparatus is also provided.

Also provided is an apparatus for carrying out each of the above method steps.

The above objects and other objects and features of the invention will be readily known to one skilled in the art from the following detailed description of the best mode for carrying out the invention when taken in connection with the accompanying drawings.

BRIEF DESCRIPTION OF THE DRAWINGS

FIG. 2 is an illustration of how different word alignment strategies in the Low-bits Encoding method of the prior art relate to type bit availability;

BEST MODE OF THE INVENTION

Figure 1:
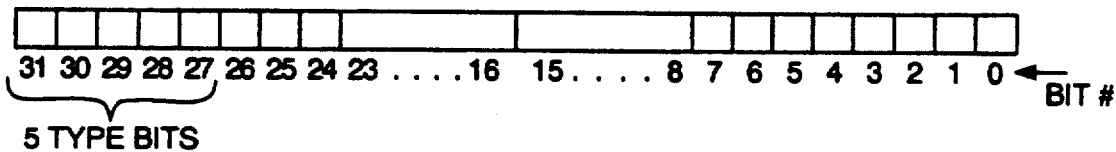
FIG. 1 is a diagrammatic representation of the type/memory trade-off required when using the Shifted, High-bits Encoding method of the prior art.
Figure 1:
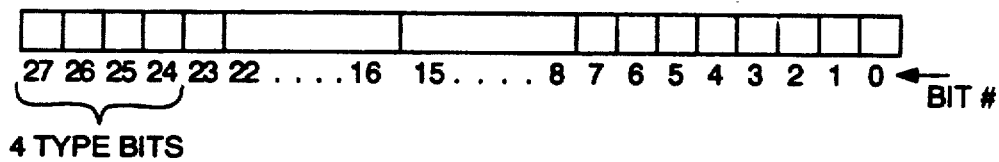

The invention is a method and an apparatus for data type encoding for use in a Common LISP application being executed on an conventional hardware. While the most fundamental operating unit of all computers remains to be the bit, the computer of today's primary operating unit is the "word." Referring now to FIG. 7, word 10 is shown generally. Word 10 is comprised of four (4) eight-bit bytes 12, 14, 16 and 18, each of which is comprised of eight (8) bits. Byte 12's eight bits are explicitly shown as 0, 1, 2, 3, 4, 5, 6, and 7. In the present invention, these eight bits are used explicitly for encoding the various data types in a LISP application.

The preferred embodiment of the invention uses the combination of the Pointer Direct and Object Direct methods of data type encoding used in the prior art. Two-word alignment is used also, so the lower three (3) bits are available for bit assignments. A non-zero state in the bit is used to signify a specific data type. By using a full lower byte to encode, a simple compare-byte instruction can be used to discern the data type.

The improvement over the prior art is the way in which byte 12's eight bits are assigned and used for encoding. When the lower three bits are all zeros, the fourth bit is used to encode a short-float object. The remaining four bits of the lower byte are available to encode 16 different data types. By manipulating the bit assignments for the Symbol and List data types, the complications of operating on NIL are significantly reduced. Similarly, by altering the low-byte encoding of short-float data types, a 28-bit short-float is available, increasing the precision of computations and decreasing the computational overhead that was associated with short-float operations in the prior art. The bit assignments and low-byte encodings of the present invention that result in the improvements are shown in FIGS. 6 and 7, respectively.

Figure 6:
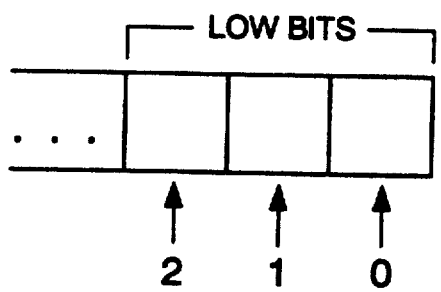
FIG. 6 is an enlarged view of the low bits of a 32-bit word representing the low bit assignments of the present invention.
Figure 7:
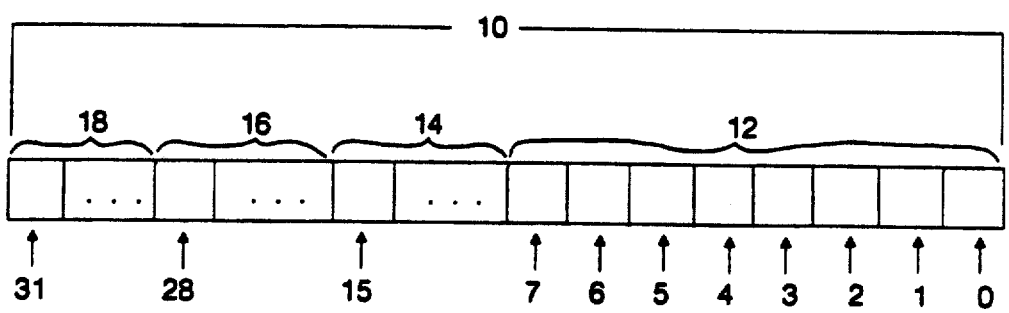
FIG. 7 is a diagrammatic representation of the low bit encoding scheme of the present invention.

As shown in FIG. 6, the new bit assignment for Symbols is bit 2 and the new bit assignment for Lists is bit 1. As discussed in the prior art, the encoding of NIL in LISP systems requires special consideration. Because NIL is a member of the Symbol and List types, it must be able to be operated on as both. Using the encodings of the prior art, these operations on NIL involved a large amount of computational overhead, because word boundaries were crossed when accessing the memory location that was pointed to.

Figures 3, 4:
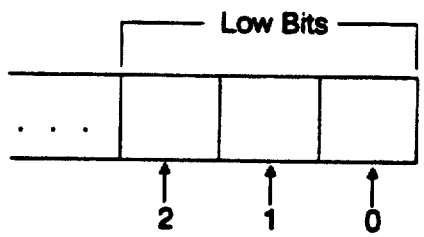
FIG. 3 is an illustration of the main disadvantage of the Pointer-Direct, Bit-Assignment Encoding method of the prior art.
FIG. 4 is an enlarged view of the low bits of a 32-bit word representing the low bit assignments associated with the hybrid scheme of encoding of the prior art.

The same bits that are used to represent Symbols and Lists are still used to represent NIL. But by moving the Symbol and List bit assignments to the new locations as shown in FIG. 6, the new bit assignment for NIL becomes 110 (referring to FIG. 4, recall the bit assignment of the prior art was 011). When performing a List operation on NIL, 6 must still be added to access the memory location. However, this addition leaves bits 0 and 1 zero and bit 3 set. Because bit 3 in binary represents a four, the resultant access to memory will fall on a word boundary in word-aligned systems. The resultant time to access the memory will be significantly reduced because word boundaries are no longer crossed. Specifically, the modified bit assignment can result in speed improvements on certain computers as much as 100 times faster.

The new bit assignments, nevertheless, offer no improvement over the prior art regarding Symbol operations on NIL. Recall that Symbol operations require that seven be added to the pointer prior to accessing the memory. Adding seven to the NIL representation of 110 still leaves bit 0 set. Subsequent memory accesses will cross word boundaries, and require the same computational overhead as in the prior art. However, it is known that List operations on NIL greatly exceed the number of Symbol operations on NIL, so the significance of the improvement should not be minimized.

Figure 5:
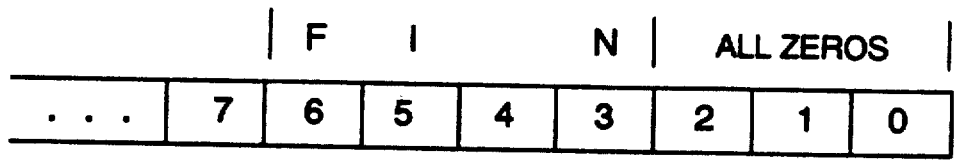
FIG. 5 is a diagrammatic representation of the low bit encodings associated with the hybrid scheme of encoding of the prior art.

The other significant improvement over the prior art involves computations involving short-float data types. The method of encoding short-floats in the prior art used the entire lower byte, as shown in FIG. 5. While this allowed for "quick" compare-byte operations, the overhead required to transform the 24-bit representation into a representation used by the hardware diminished the benefit of using the compare-byte instruction. In addition, the precision of computations using these short-floats suffered. The encoding scheme of the claimed invention, shown in FIG. 7, retains the advantage of a quick compare, and allows for a 28-bit short-float representation that can be used without modification by conventional hardware, eliminating the computational overhead and increasing the precision of the prior method.

In the claimed invention, bit 3 is used in conjunction with bits 0, 1 and 2 to encode a short-float. As in the prior art, bits 0, 1, and 2 must be all zeros for a short-float. In the present invention, however, only bit 3 is used to encode a short-float, instead of using the remainder of the lower byte. By using only bit 3, a "quick" bit test can be performed to check the state of bit 4. Bits 4, 5, 6 and 7 increase the available bits for containing immediate object information from 24 to 28, which is consistent with hardware representation. The result is higher precision and a significant speedup of roughly 10-20 times when applying operations to the short-float objects.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. In a data processing system including a byte-addressed memory, a method for encoding data tyes to identify the type of object being operated on during execution of a computer program on the system, the object being represented by at least one machine word including a lower byte, the method comprising the steps of:
    storing an object in the byte addressed memory wherein the lower byte of the word is reserved for encoding the object type and wherein the lower three bits of the lower byte are in a zero state;
    setting at least two bits of the three lower bits to a non-zero state to indicate a particular data type; wherein the step of setting the two upper bits of the three lower bits indicates that the object is a member of two data types; and
    performing an operation on the particular data type, the operation including accessing a particular memory location in the byte-addressed memory, the upper two of the lower three bits are set such that the particular memory location accessed falls on a word boundary in the byte-addressed memory.

2. In a data processing system including a byte-addressed memory, a method for encoding data tyes to identify the type of object being operated on during execution of a computer program on the system, the object being represented by at least one machine word having a plurality of bits, the method comprising the steps of:
    storing an object in the type addressed memory so that the lower three bits of the object are in a zero state;
    setting one of the lower three bits to a non-zero state to indicate a particular data type, other than a short-float object data type, wherein three different types of data can be verified by checking the state of a single bit; and
    setting a bit immediately adjacent the lower three bits to a non-zero state to indicate whether the object is a short-float object.

3. The method as claimed in claim 2 further comprising the step of setting to a non-zero state at least one bit of a plurality of bits immediately to the left of the immediately adjacent bit to indicate that an object is of a particular data type wherein sixteen data types can be verified by the lower eight bits of the object and wherein the lower four bits are in a zero state.

4. The method as claimed in claim 1 or claim 2 or claim 3 wherein the system utilizes latent data typing wherein determination of data type is allowed to be delayed during run time.

5. In a data processing system including a byte-addressed memory, an apparatus for encoding data types to identify the type of object being operated on during execution of a computer program on the system, the object being represented by at least one machine word including a lower byte, the apparatus comprising:
    means for storing an object in the byte addressed memory wherein the lower byte of the word is reserved for encoding the object type and the lower three bits of the lower byte are in a zero state;
    means for setting at least two bits of the three lower bits to a non-zero state to indicate a particular data type; wherein the at least two bits of the lower three bits are set to indicate that the object is a member of two data types and wherein the means for setting at least two of the lower three bits further comprises means for setting the upper two bits of the lower three bits to a non-zero state; and means for operating on the particular data type, the operation including accessing a particular memory location in the byte-addressed memory, the upper two of the lower three bits are set such that the particular memory location accessed falls on a word boundary in the byte-addressed memory.

6. In a data processing system including a byte-addressed memory, an apparatus for encoding data tyes to identify the type of object being operated on during execution of a computer program on the system, the object being represented by at least one machine word having a plurality of bits, the apparatus comprising:

means for storing an object in the byte addressed memory so that the lower three bits of the object are in a zero state;

means for setting one of the lower three bits to a non-zero state to indicate a particular data type, other than a short-float object data type, wherein three different types of data can be verified by checking the state of a single bit; and means for setting a bit immediately adjacent the lower three bits to a non-zero state to indicate whether the object is a short-float object.

7. The apparatus as claimed in claim 6 further comprising means for setting to a non-zero state at least one bit of a plurality of bits immediately to the left of the immediately adjacent bit to indicate that an object is of a particular dta type wherein sixteen data types can be verified by the lower eight bits of the object and wherein the lower four bits are in a zero state.

8. The apparatus as claimed in claim 5 or claim 6 or claim 7 wherein the system utilizes latent data typing wherein determination of data type is allowed to be delayed during run time.

* * * * *

UNITED STATES PATENT AND TRADEMARK OFFICE
CERTIFICATE OF CORRECTION

PATENT NO. : 5,283,878
DATED : Feb. 1, 1994
INVENTOR(S) : Kelly E. Murray

It is certified that error appears in the above-indentified patent and that said Letters Patent is hereby corrected as shown below:

Column 8, line 31, after "IN THE" replace "TYPE" with --BYTE--

Column 8, line 61, after "TYPE AND" insert --WHEREIN--.

Signed and Sealed this

Fifth Day of July, 1994

*Attest:*

*Attesting Officer*

BRUCE LEHMAN

*Commissioner of Patents and Trademarks*